(12) United States Patent
Vuong

(10) Patent No.: US 7,658,561 B2
(45) Date of Patent: Feb. 9, 2010

(54) MODIFIED KEYBOARD ARRANGEMENT WITH DISTINCT VOWEL KEYS

(75) Inventor: Thanh Vinh Vuong, Kitchener (CA)

(73) Assignee: Research In Motion Limited, Waterloo, Ontario (CA)

( * ) Notice: Subject to any disclaimer, the term of this patent is extended or adjusted under 35 U.S.C. 154(b) by 331 days.

(21) Appl. No.: 11/535,547

(22) Filed: Sep. 27, 2006

(65) Prior Publication Data

US 2008/0075517 A1 Mar. 27, 2008

(51) Int. Cl.
*B41J 5/00* (2006.01)
(52) U.S. Cl. ........................... 400/486; 400/485
(58) Field of Classification Search ............ 400/486, 400/488, 485
See application file for complete search history.

(56) References Cited

U.S. PATENT DOCUMENTS

| | | | | |
|---|---|---|---|---|
| 5,818,437 | A * | 10/1998 | Grover et al. | 715/811 |
| 5,952,942 | A | 9/1999 | Balakrishnan | |
| 6,002,390 | A | 12/1999 | Masui | |
| 6,223,059 | B1 * | 4/2001 | Haestrup | 455/566 |
| 6,231,252 | B1 * | 5/2001 | Kitamura | 400/484 |
| 6,307,548 | B1 | 10/2001 | Flinchem | |
| 6,310,609 | B1 * | 10/2001 | Morgenthaler | 345/170 |
| 6,356,258 | B1 * | 3/2002 | Kato et al. | 345/168 |
| 6,377,685 | B1 * | 4/2002 | Krishnan | 379/433.07 |
| 7,220,069 | B2 * | 5/2007 | Griffin et al. | 400/486 |
| 7,439,959 | B2 * | 10/2008 | Griffin et al. | 345/169 |
| 2003/0121964 | A1 * | 7/2003 | Crisan | 235/60 R |
| 2005/0163307 | A1 | 7/2005 | Kwok | |
| 2006/0030375 | A1 * | 2/2006 | Tanaka | 455/575.1 |

FOREIGN PATENT DOCUMENTS

| | | |
|---|---|---|
| EP | 0129621 | 1/1985 |
| EP | 1035712 | 9/2000 |
| EP | 1347362 | 3/2002 |
| EP | 1347361 | 9/2003 |
| EP | 1378817 | 1/2004 |
| GB | 2386097 A | 9/2003 |
| WO | 9959310 | 11/1999 |
| WO | 0062150 | 10/2000 |
| WO | 03007582 A | 1/2003 |
| WO | 03044650 | 5/2003 |
| WO | 2005109644 A | 11/2005 |

OTHER PUBLICATIONS

European Search Report, EPA 06121341; Mar. 1, 2007.

* cited by examiner

*Primary Examiner*—Anthony H. Nguyen
(74) *Attorney, Agent, or Firm*—Novak Druce + Quigg LLP

(57) ABSTRACT

A key arrangement includes a plurality of keys associated with alphabetic characters that include consonants and vowels. Each key within the plurality of keys is associated with a plurality of consonants and no more than one vowel. The plurality of keys is arranged in a grid pattern having at least five keys. The consonants are arranged in a standard keyboard format. Numbers may also be associated with the keys. A mobile communication device includes the key arrangement, a display, a processor, a housing, and a plurality of toggle switches associated with the keys. A method of using a key arrangement is also described.

24 Claims, 9 Drawing Sheets

MODIFIED KEYBOARD ARRANGEMENT WITH DISTINCT VOWEL KEYS

FIELD

This technology relates to an arrangement of keys for an electronic device. In particular, the technology concerns an arrangement of keys for a handheld mobile communication device.

BACKGROUND

Different standard English-language keyboard arrangements such as the QWERTY, QWERTZ, AZERTY, DVORAK, and FITALY arrangements are known. The most widely used English-language alphabetic key arrangement is the QWERTY arrangement 10, as shown in FIG. 1. The QWERTY keyboard arrangement 10 is a proven industry standard, providing benefits in typing speed and accuracy.

The standard QWERTY keyboard arrangement works on typewriters, computer keyboards, electronic personal digital assistants (PDAs) and mobile devices where the width of the device provides sufficient area for a full sized QWERTY arrangement. FIG. 2 illustrates a mobile device 12 incorporating a standard full-sized QWERTY keyboard 14.

A standard full-sized QWERTY keyboard 14 usually includes three rows and 10 columns of keys arranged in a QWERTY layout representing all the letters of the English alphabet. Furthermore, numbers (0-9) and symbols are either positioned adjacent letters or share keys with letters via toggle keys 55 (e.g., shift, alt, etc.). Full-sized QWERTY keyboard 14 typically suits larger mobile devices with adequate space to accommodate the size of all keys. However, smaller mobile devices such as mobile phones and smart phones may not have sufficient area to accommodate a full QWERTY keyboard.

Mobile devices 12, such as mobile phones, personal digital assistants, pagers, and other devices, commonly incorporate alphanumeric keyboards. Numbers may share keys with alphabetic characters on the top row 16 of a QWERTY keyboard. Alternatively, alphabetic characters may be arranged in a numeric phone keypad arrangement 18, such as one consistent with ITU Standard E. 161, entitled "Arrangement of Digits, Letters, and Symbols on Telephones and Other Devices That Can Be Used for Gaining Access to a Telephone Network." This standard is also known as ANSI TI. 703-1995/1999 and ISO/IEC 9995-8:1994 and is the standard that you see on most, if not all, telephones sold in the United States today and many mobile phones.

Traditional mobile phones and smart-phones utilize either a Tegic, T9 or multi-tap technique for character input. The main drawback of Tegic, T9 and multi-tap keyboards is that they are cumbersome to use in typing. To access a specific character, a user must press a specific key numerous times. For example, for ITU Standard E. 161 keypads, to access the "C" character, a user must tap the "1" key three times. Consequently, typing on a Tegic, T9, or multi-tap keyboard proves to be slow, frustrating and burdensome.

Reduced size keyboards 20 that are arranged in a standard QWERTY format, shown in FIGS. 3 and 4, are known. This reduced QWERTY keyboard arrangement 20 utilizes the same number of rows 22 of keys, but reduces the number of columns 24 by combining multiple letters onto one key. U.S. Pat. No. 7,083,342 to Griffin describes a mobile communication device that has a reduced QWERTY keyboard of this type, the disclosure of which is incorporated herein by reference in its entirety.

The reduced QWERTY keyboard arrangement 20 is suitable for use on medium to larger-size mobile devices that have the space to accommodate up to five columns of keys. However, slimmer phones and smart-phones that may only accommodate up to three columns of keys for a traditional number-pad may not have sufficient area to incorporate the reduced QWERTY arrangement 20. Additionally, some users may consider the reduced QWERTY keyboard arrangement 20 unstylish or unfashionable compared to the traditional, slimmer number-pad keyboard arrangement.

SUMMARY

A key arrangement, method of using a key arrangement, and mobile device incorporating a key arrangement are described herein.

BRIEF DESCRIPTION OF THE DRAWING FIGURES

DETAILED DESCRIPTION

Figure 1:
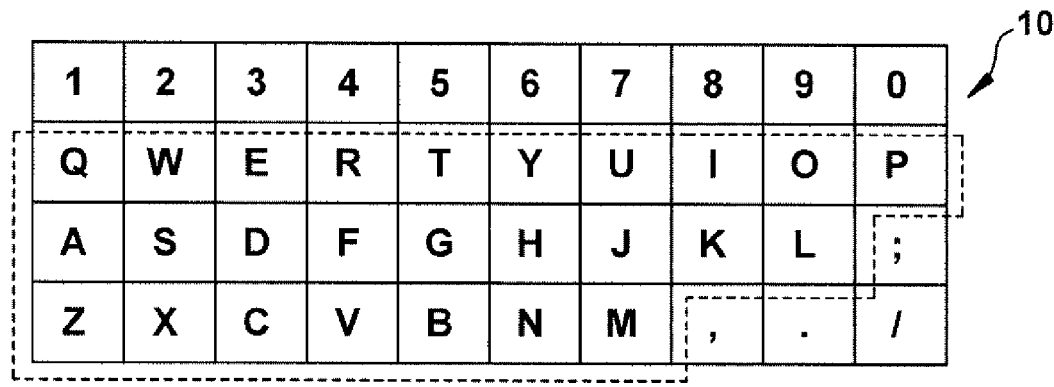
FIG. 1 illustrates a prior art standard full-sized QWERTY alphabetic key arrangement.
Figure 2:
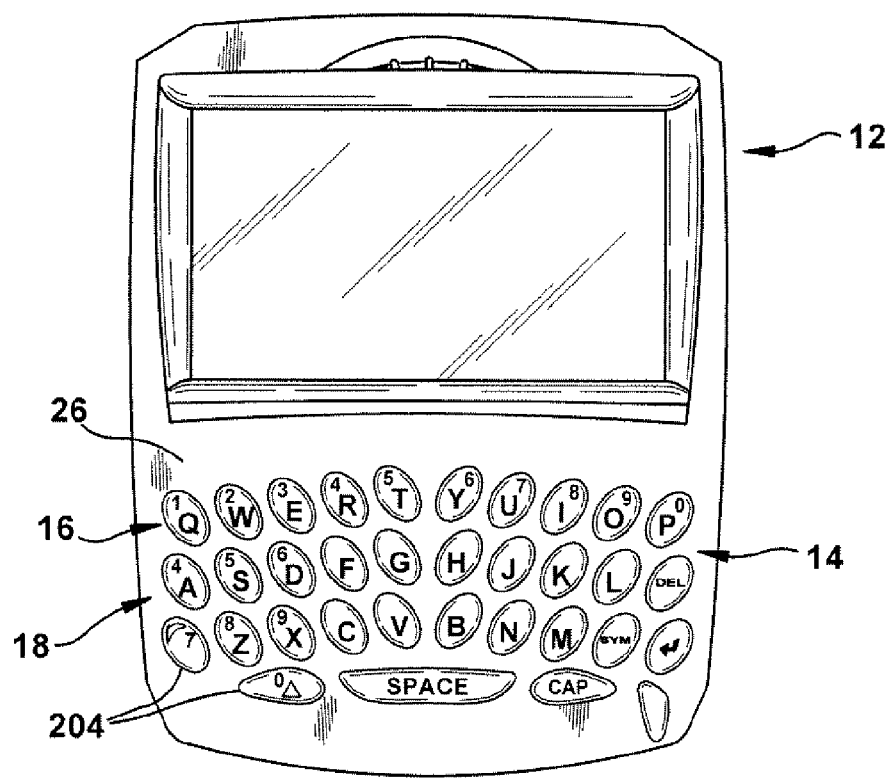
FIG. 2 illustrates a prior art mobile device incorporating a standard full-sized QWERTY alphabetic key arrangement.
Figure 3:
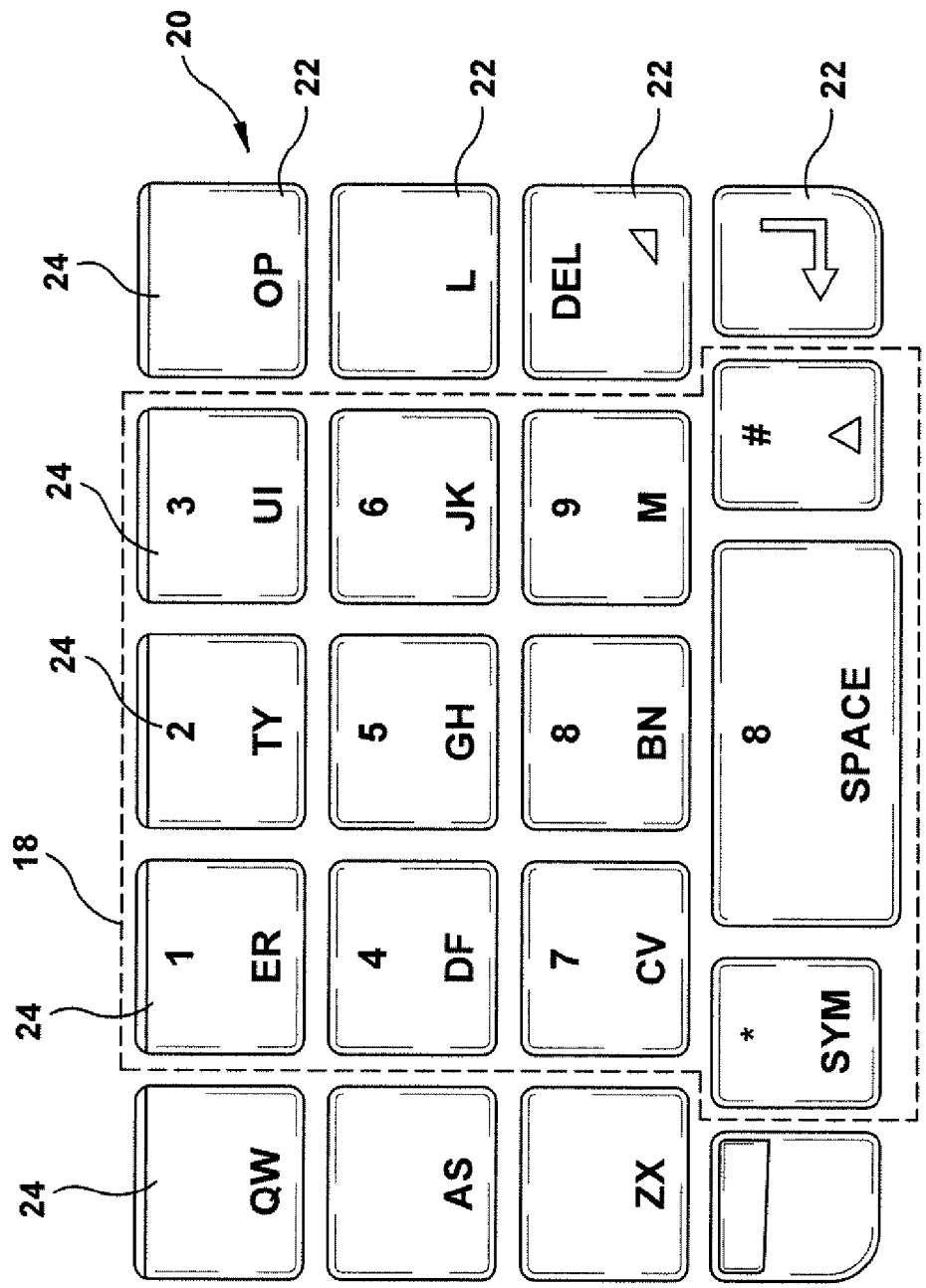
FIG. 3 illustrates a prior art reduced QWERTY alphabetic key arrangement.
Figure 4:
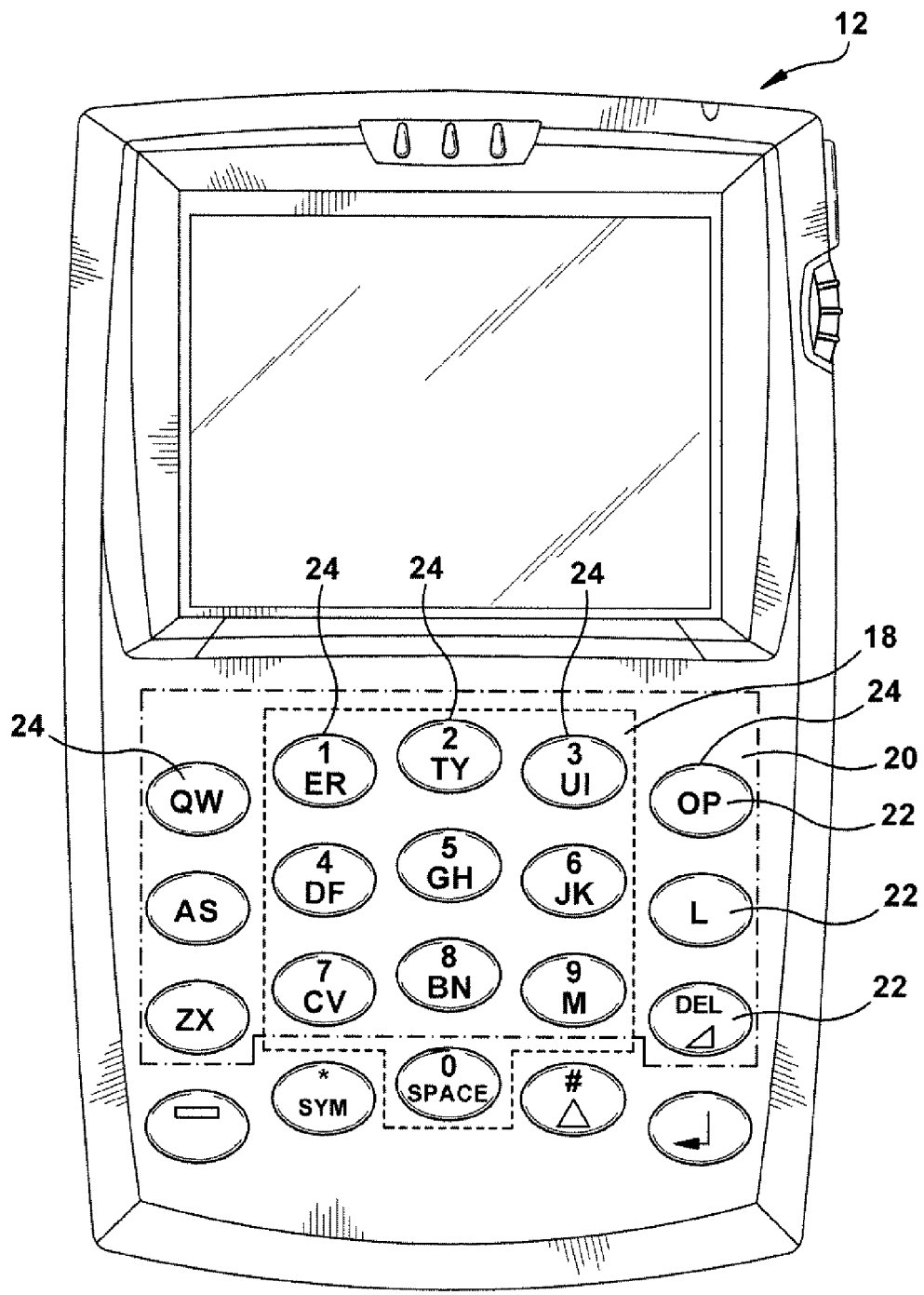
FIG. 4 illustrates a prior art mobile device incorporating a reduced QWERTY alphabetic key arrangement.

A full size QWERTY keyboard 10 is presented in FIG. 1 and a prior art device 12 that incorporates a full QWERTY keyboard 14 is presented in FIG. 2. As can be seen in FIG. 2, the full size QWERTY keyboard takes up a significant amount of space on the face 26 of the device 12. As a result, devices that incorporate full size QWERTY keyboards 10 tend to be larger than other mobile devices. In order to reduce the size of QWERTY arrangements, keyboards have been designed that utilize fewer than 26 alphabetic keys, such as the prior are examples 20 shown in FIGS. 3 and 4. By using less keys that the standard full size QWERTY 10, less space is used on the face of the mobile device and the device 12 may be made smaller. These reduced QWERTY keyboards 20 maintain the same order for the alphabetic characters as the full size QWERTY keyboard 10, but associate more than one letter and/or number with each key. The presently described example modified keyboard 30 takes the reduced size one step farther, resulting in fewer keys and the possibility for an overall smaller size for the mobile device 12, while maintaining the familiarity to the user of a QWERTY key arrangement.

Figure 5A:
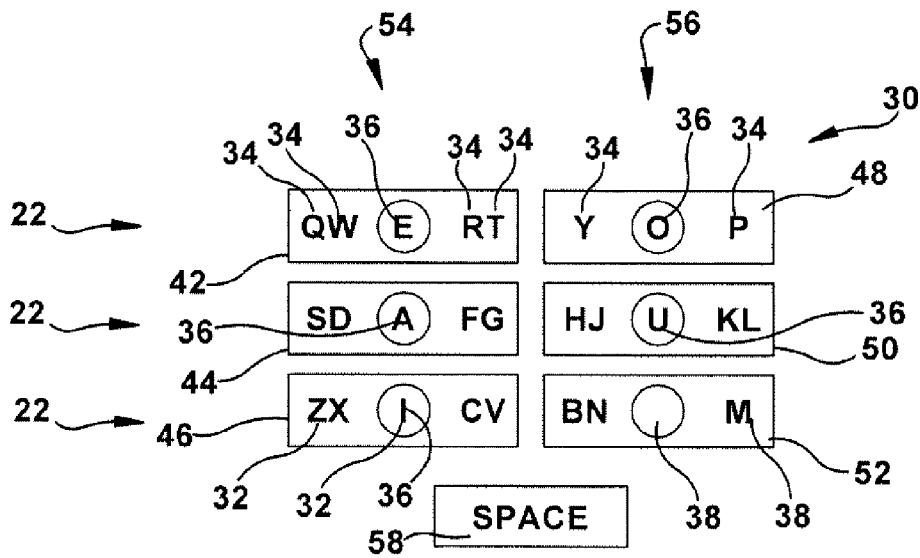
FIG. 5a illustrates an example modified QWERTY alphabetic key arrangement with keys arranged in two columns and distinct vowel keys.
Figure 5B:
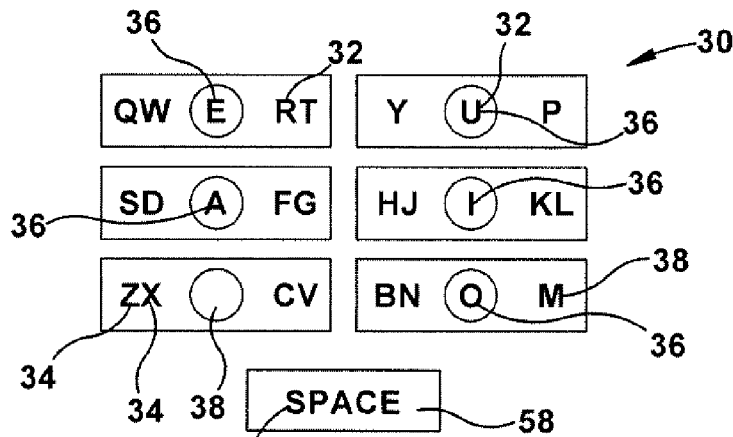
FIG. 5b illustrates an alternative modified QWERTY alphabetic key arrangement with keys arranged in two columns and distinct vowel keys.

An example modified QWERTY keyboard arrangement 30 is depicted in FIGS. 5A and 5B and includes a 2 column 54, 56 by 3 row 22 array of keys, each of which is associated with one or more characters that include letters, numbers, symbols, and functions. The associated characters are presented on each key via indicia 32 that is printed on the keys, and programming within the mobile device 12 is designed such that it recognizes the selected character(s) based upon which key is selected. The alphabetic characters include consonants 34 and vowels 36. The consonants 34 of the example modified QWERTY arrangement 30 are mapped according to the touch typing finger assignments for a traditional QWERTY layout. But the vowels 36 are not all mapped in the traditional QWERTY style. The modified QWERTY key arrangement 30 has two columns 54, 56 and three rows 22. Distinct vowel keys are provided such that the entire alphabet representing all twenty-six letters of the English language are provided.

As shown in FIGS. 5A and 5B, the alphabetic characters are arranged in a modified QWERTY format 30, where the consonants 34 are arranged in a standard QWERTY arrangement and the vowels 36 are split up among each of the keys such that no more than one vowel is associated with each key. Since five vowels 36 are present in the English language, one of the six keys will not include a vowel and may alternatively be associated with a symbol 38 and/or function 40. Additional symbols, functions and numbers may be associated with the same or additional keys. While a QWERTY arrangement is depicted in the figures, it will be readily recognized that any standard key arrangement may be utilized with the present examples, including key layouts consistent with QWERTZ, AZERTY, DVORAK, or FITALY arrangements, among other known keyboard arrangements.

Examples of symbols 38 that may be utilized on a mobile device 12 include punctuation characters and other symbols, including !, @, #, $, %, ^, &, *, (,), _, -, +, =, ~, ', {, }, [, ], :, ;, ", ', <, >, ?, /, .,. The letters, numbers, symbols, and punctuation characters associated with written communication may be in English or a language other than English, such as German, French, Spanish, Italian, Russian, and other international, national, and regional dialects and languages, including computer programming languages, mathematics, and scientific expression.

Examples of functions 40 that may be utilized on a mobile device 12 include TAB, CAPS LOCK, SHIFT, CTRL, ALT, ESC, Backspace, INSERT, SPACE, HOME, Page up, Page down, Delete, End, ENTER, Pause, Break, send, end, and many other functions. Function keys may enable the mobile device's functionality, such as Send, Convenience, and End keys in the example of a phone application, and such keys may enable use of the modified keyboard 30, as in the example of a toggle key 55 used to shift between lowercase and uppercase letters or between alphabetic characters, numbers, or symbols.

The 2×3 array of keys in the example modified keyboard 30 includes a first 42, second 44, and third 46 key in the first column 54 and a fourth 48, fifth 50, and sixth 52 key in the second column 56. On a standard QWERTY keyboard, the rows may be split in half in order to correspond to the left and right halves, for example. When the first row of the QWERTY keyboard is split in two, the right half consists of the letters "Y, U, I, O, P". However, since the example modified key arrangement 30 provides for a single vowel 36 per key, the vowels "U, I, O" are split up and moved onto other keys, thereby modifying the traditional QWERTY layout. Consonants 34 remain arranged in a traditional QWERTY arrangement and are mapped according to the touch typing finger assignments for a traditional QWERTY layout. Since there are only five vowels and six keys within the 2×3 array, the sixth key may be used to represent punctuation or a function that is regularly used.

Referring to FIG. 5A, an example is shown where consonants 34 are arranged in a layout consistent with a QWERTY arrangement and vowels 36 are interspersed among the keys. A first key 42 is associated with letters Q, W, f, R, and T. A second key 44 is positioned below the first key and is associated with letters S, D, A, F, and G. A third key 46 is positioned below the second key and is associated with letters Z, X, I, C, and V. A fourth key 48 is associated with letters Y, O, and P and is positioned to the right of the first key. A fifth key 50 is associated with letters H, J, U, K, and L and is positioned below the fourth key. A sixth key 52 is associated with letters B, N, and M and symbols 38 comma (,) and period (.) and is positioned below the fifth key.

Another example key arrangement 30 is presented in FIG. 5B, where consonants 34 are arranged in a layout consistent with a QWERTY arrangement and vowels 36 are interspersed among the keys. A first key 42 is associated with letters Q, W, E, R, and T, A second key 44 is positioned below the first key 42 and is associated with letters S, D, A, F, and G. A third key 46 is associated with letters Z, X, C, and V and symbols comma (,) and is positioned below the second key 44. A fourth key 48 is associated with letters Y, U, and P and is positioned to the right of the first key 42. A fifth key 50 is associated with letters H, J, I, K, and L and is positioned below the fourth key 48. A sixth key 52 is associated with the letters B, N, O, and M and symbol 38 period (.).

Figure 5C:
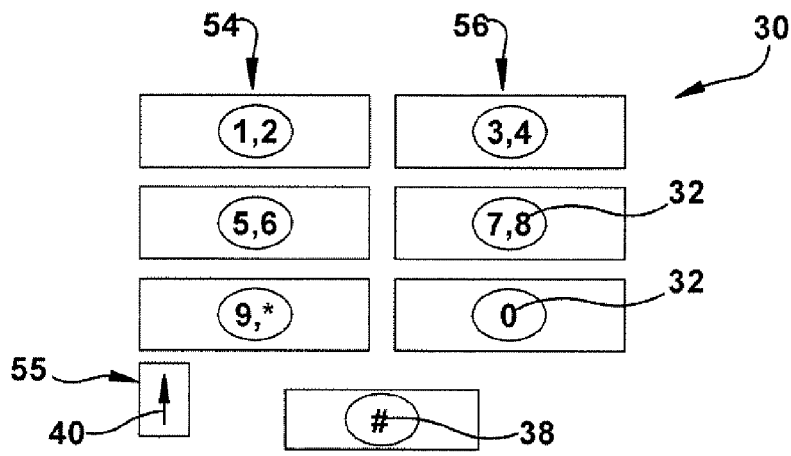
FIG. 5c illustrates an example numeric arrangement that may be associated with the pseudo-QWERTY key arrangements presented in FIGS. 5a & 5b.
Figure 5D:
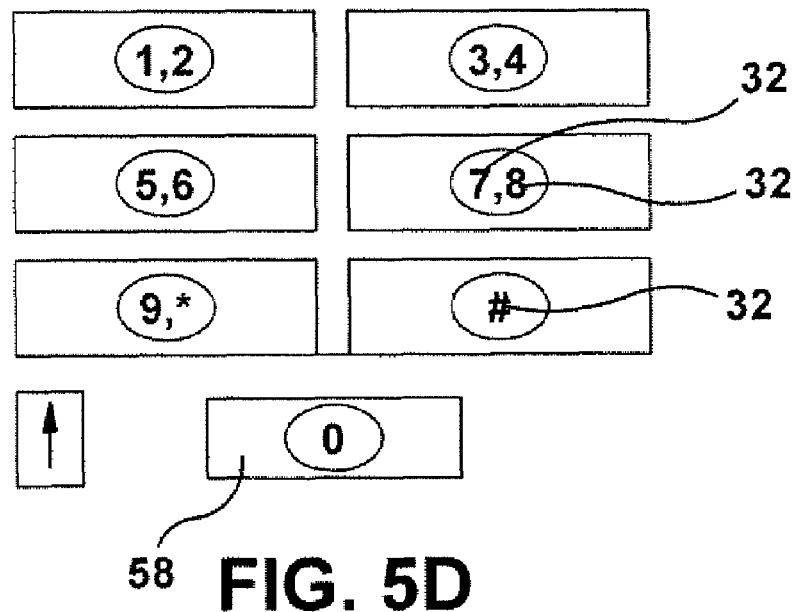
FIG. 5d illustrates an alternative example numeric arrangement.
Figure 6:
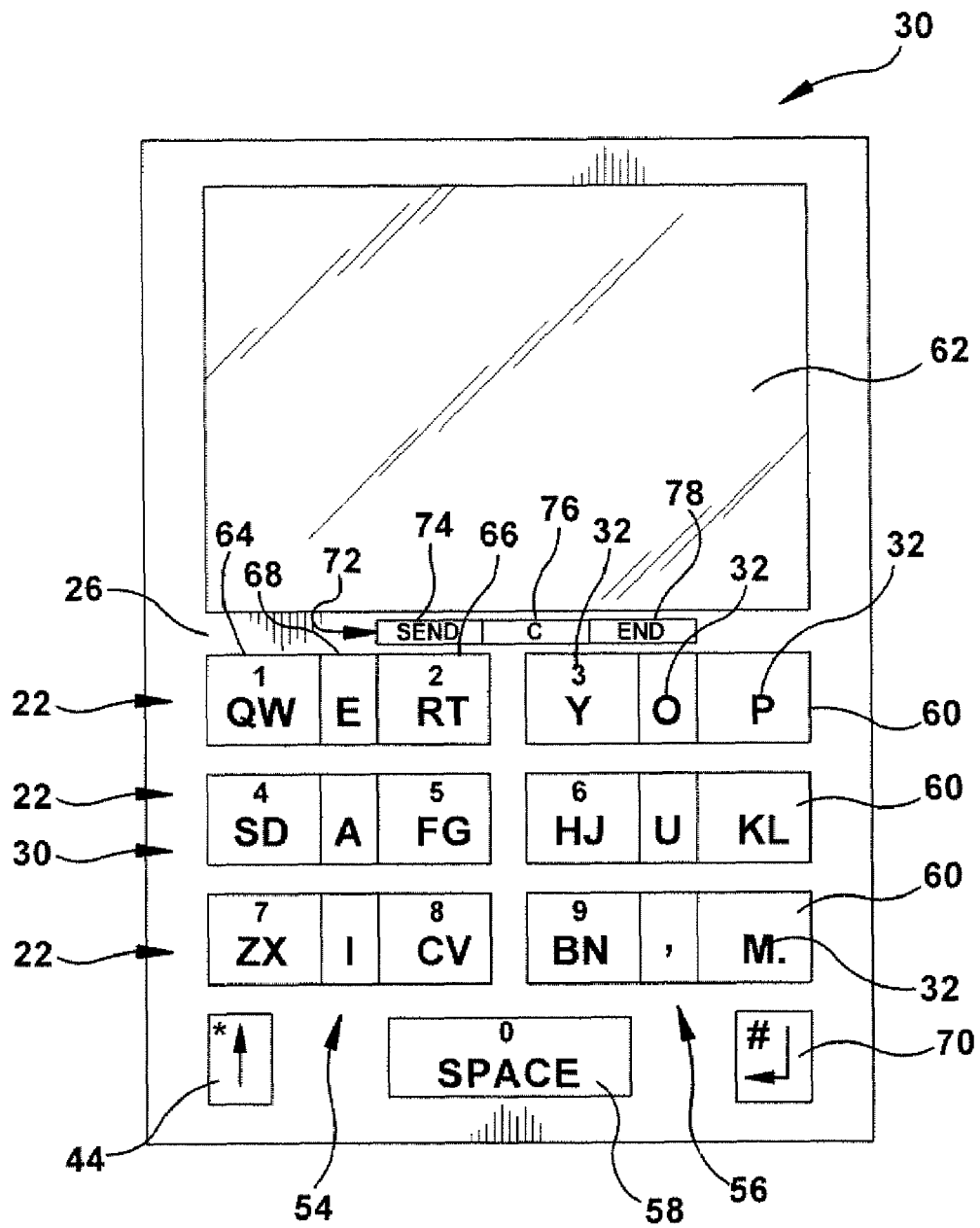
FIG. 6 illustrates a mobile device incorporating an example key arrangement, such as that shown in FIGS. 5a and 5e.

Referring to FIGS. 5c & 5d, the keys of the modified keyboard 30 may also be associated with numbers 0-9. The numbers may be activated using a function key, such as an Alt or a toggle key 55. Alternatively, the mobile device 12 may be programmed such that when the phone is in different modes, the keys may be pressed directly to obtain either numbers or letters. The indicia for the numbers may be positioned as indicated on the keys, as shown in FIG. 6, or may be positioned adjacent the keys if space permits on the face 26 of the device 12.

The numbers may be arranged in a layout consistent with a telephone keypad, or may be arranged in numeric order. For example, as shown in FIG. 5, one key is associated with numbers 1 and 2, another key is associated with numbers 3 and 4, another key is associated with numbers 5 and 6, another key is associated with numbers 7 and 8, another key is associated with number 9 and symbol character star (*), another key is associated with number 0, and the space key 58 is associated with the symbol character pound (#).

In an alternative example, shown in FIG. 5d, one key is associated with numbers 1 and 2, another key is associated with numbers 3 and 4, another key is associated with numbers 5 and 6, another key is associated with numbers 7 and 8, another key is associated with number 9 and symbol character star (*), another key is associated with symbol character pound (#) and the space key(s) 58 is associated with the number 0.

Figure 5E:
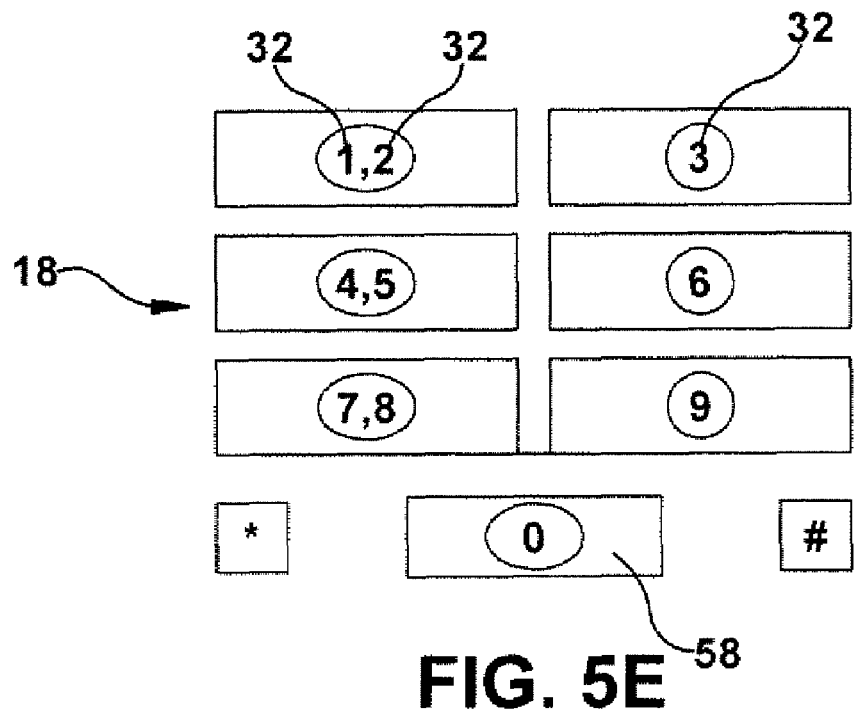
FIG. 5e illustrates another example where the numbers are arranged in a standard telephone keypad arrangement.

Another example, shown in FIG. 5E, depicts the numbers arranged in the format of a standard telephone keypad 18. One key is associated with the numbers 1 and 2, another key is associated with the number 3, another key is associated with the numbers 4 and 5, another key is associated with the number 6, another key is associated with the numbers 7 and 8, another key is associated with the number 9, and the space key 58 is associated with a 0. Additional keys may be utilized for symbols * and #.

As previously discussed, each key depicts indicia 32 associated with the characters that are associated with the respective key. Each key has an upwardly extending face 60, and the indicia 32 is applied to the face 60 of the key in a known manner. Alternatively, the indicia 32 could be provided on the surface of the face 26 of the device 12, adjacent each key, if space permitted. As shown in FIGS. 5A and 5B, a desirable location for the vowel 36 indicia 32 is to be positioned in the center of each key, with consonant 34 indicia 32 positioned on either side of the vowels 36. Alternatively, the vowel 36 indicia 32 could be positioned on a left or a right side of each key, with consonants 34, symbols 38 or functions 40 positioned in the center of each key. Since there are only five vowels in the English language and in the QWERTY key arrangement, one of the six keys within the grid will not be associated with a vowel. When vowel 36 indicia 32 is associated with the centers of five of the six keys, the center of the sixth key may be used for punctuation, as shown in FIGS. 5A and 5B, or could be associated with consonants or functions.

There are a number of different ways that the mobile device 12 may be programmed in order to interpret the keystroke entry. In a multi-tap methodology, the user taps a key multiple times until a desired letter, number, symbol, or function is selected. Multi-tapping involves tapping one time to select one number on the key and a second time for the second number. For example, to select a "1" on the first key, users will tap on the first key once, to select a "2", users will tap twice on the same key. This technology has been utilized on cell phones and touch screen devices, among other devices. Companies that offer solutions for the multi-tap method include Motorola (e.g., iTAP); Zi (e.g., eZiText); AOL (Tegic) (e.g., T9); and Eatoni (e.g., LetterWise). A related method is the long tap method, where a user depresses the key until the desired character appears on the display 62. An alternative key stroke entry technique is to employ predictive text programming, where the device is programmed to select a word from among the many variations possible based upon the characters associated with the keys.

FIG. 6 illustrates a mobile device 12 having a body with a face 26, a display 62 and an example of the modified QWERTY alphabetic key arrangement 30 with distinct vowel keys. The mobile device 12 incorporates alphabetic keys that are laid out in a two column 54, 56 by three row 22 array. Each of the keys in the array are split into three distinct sections, including a left section 64, a right section 66 and a center section 68. A space key 58 is positioned below the array, a toggle key 55 is positioned to the left of the space key 58, and a return key 70 is positioned to the right of the space key 58. A row 72 of function keys is positioned above the array. Three keys are shown, including a send 74, convenience 76, and end key 78. The send 74 and end keys 78 are for use in phone mode. The convenience key 76 may be programmed to perform whatever function is desired, or it may be omitted altogether. The function keys in this upper row 72 are shown having a size that is significantly smaller than the size of the keys within the array. They may alternatively be larger in size. The mobile device 12 may incorporate other keys and/or peripheral inputs and outputs, including but not limited to a thumbwheel, a speaker port, a microphone, a camera, and any other features known to be utilized with a mobile device.

As previously discussed in connection with FIG. 6, each key may be divided into three separate sections 64, 66, 68. These sections may lie in a single plane, or may be located on different planes, as shown in FIGS. 7A-7G. As shown, each key associated with a vowel character may display the vowel character and a plurality of non-vowel characters on a plurality of surfaces situated in a single plane. Alternatively, each key may display the vowel indicia on a key surface situated in a first plane, while the non-vowel indicia is displayed on a surface situated in at least one other plane.

Figure 7A:
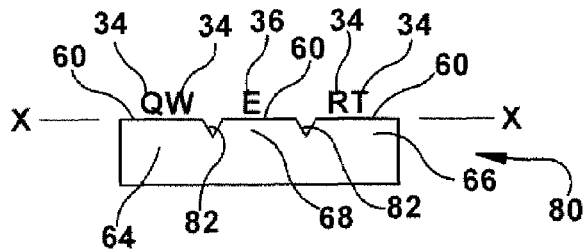
FIG. 7a illustrates an example key where all character indicia is located on the same plane.

FIG. 7a illustrates key 80, where the consonants 34 and vowel 36 indicia are all positioned in a single, common plane X-X. The plane may be uninterrupted (not shown), or may be separated with the use of a surface treatment such as the formation of channels 82 in the surface of the key. Any type of surface treatment may be provided and the surface treatment may provide tactile feedback to the user in order to more easily locate the desired portion of the respective key.

Figure 7B:
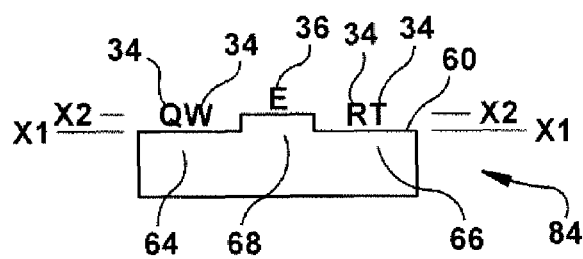
FIG. 7b illustrates an example key where character indicia for the middle section is on a separate plane.

FIG. 7b illustrates another example key 84, where letters are situated on multiple planes. Key 84 is separated into three sections; the left 64 and right 66 sections representing the consonants 34 and the middle section representing a vowel 36. The middle section is elevated to a separate plane X2-X2 such that the consonants are positioned in a single, common plane X1-X1, with the vowel being elevated above this plane. The placement of the vowel 36 on a separate plane enables the vowel keys to be more easily tactilely and visually identified by a user.

Figure 7C:
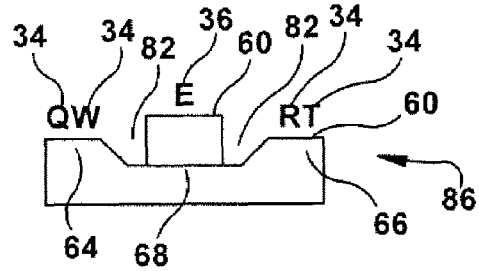
FIG. 7c illustrates an alternate example key that where the character indicia for the middle section is on a separate plane.

FIG. 7c illustrates an alternate example key 86, similar to that of FIG. 7b, but also including channels 82 that are defined between the vowel 36 and consonant 34 sections. The channels 82 are a form of surface treatment that provides additional visual and tactile feedback to a user to more readily distinguish the various sections 64, 66, 68 of the keys.

Figure 7D:
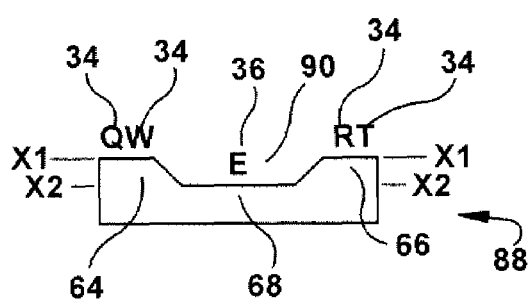
FIG. 7d illustrates an alternate example key where the character indicia for the middle section is in on a separate plane.

FIG. 7d illustrates another example key 88 where the consonants 34 are positioned on a plane X1-X1 that is distinct from the vowel 36, but in this example, the vowel 36 is associated with a plane X2-X2 that is recessed relative to the common plane X1-X1 of the consonant 34 indicia. The entire surface associated with the vowel 36 is recessed relative to the remainder of the key surface. This design will also provide tactile and visual feedback to a user to more readily identify the various sections of the keys. In addition, the finger of the user may be drawn to the recess 90, making vowels more readily identifiable.

Figure 7E:
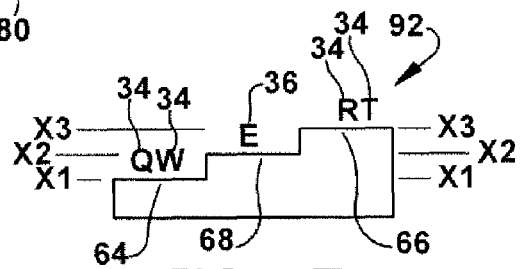
FIG. 7e illustrates an alternate example key where the character indicia for each section is on a separate plane.
Figure 7F:
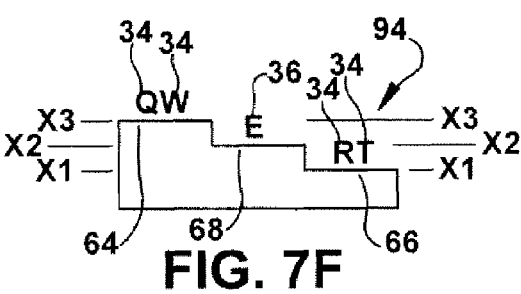
FIG. 7f illustrates an alternate example key where the character indicia for each section is on a separate plane.

FIG. 7e illustrates another example key 92 where the three sections 64, 66, 68 of the key all lie in different planes. The lowermost plane X1-X1 is associated with the left section 64 of the key 92 and is used for consonants 34. The middle plane X2-X2 is positioned in the center section 68 of the key, and the uppermost plane X3-X3 is associated with the right section 66 of the key 92. FIG. 7f illustrates a key 94 exhibiting a similar phenomenon, but in a mirror image.

Figure 7G:
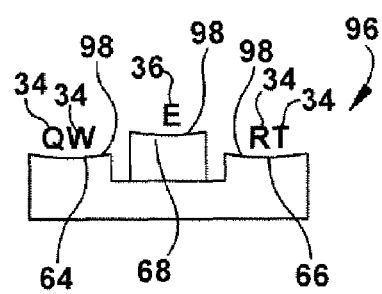
FIG. 7g illustrates an alternate example key where the character indicia for the middle section is on a different plane and the upper surface of the sections have a surface treatment.

FIG. 7g illustrates a further example key 96, where the surfaces of the keys have a surface treatment to aid in identifying the respective surfaces. In this example, the center section 68 of the key 96 is elevated relative to the end sections 64, 66, but each surface has an indentation 98. The finger of a user may be more readily drawn to the indentation 98. Other surface treatments known to those of skill in the art may alternatively be utilized.

The keys 80, 84, 86, 88, 92, 94, 96 may be associated with a toggle switch (not shown), which is a mechanical switch where the user can toggle between one or more values. An example of a toggle switch is an ON/OFF switch for a light bulb. The example keys 80, 84, 86, 88, 92, 94, 96 may utilize a toggle switch comprising a left toggle, a right toggle and a center button capable of storing a third selection (e.g., a vowel value). To access the multiple consonants on the left or right toggle, the device 12 may be programmed to use a multi-tap input technique, where the user will toggle in that direction multiple times. For example, to access the consonant "W", the user will toggle the left side of the key 64 twice and to access the consonant "T", the user will toggle the right side of key 68 twice. Instead of multi-tap, the toggle keys may be tied to a predictive text subroutine that predicts the input based upon the selected surfaces of the keys. Predictive text routines are known by those of skill in the art.

Figure 8:
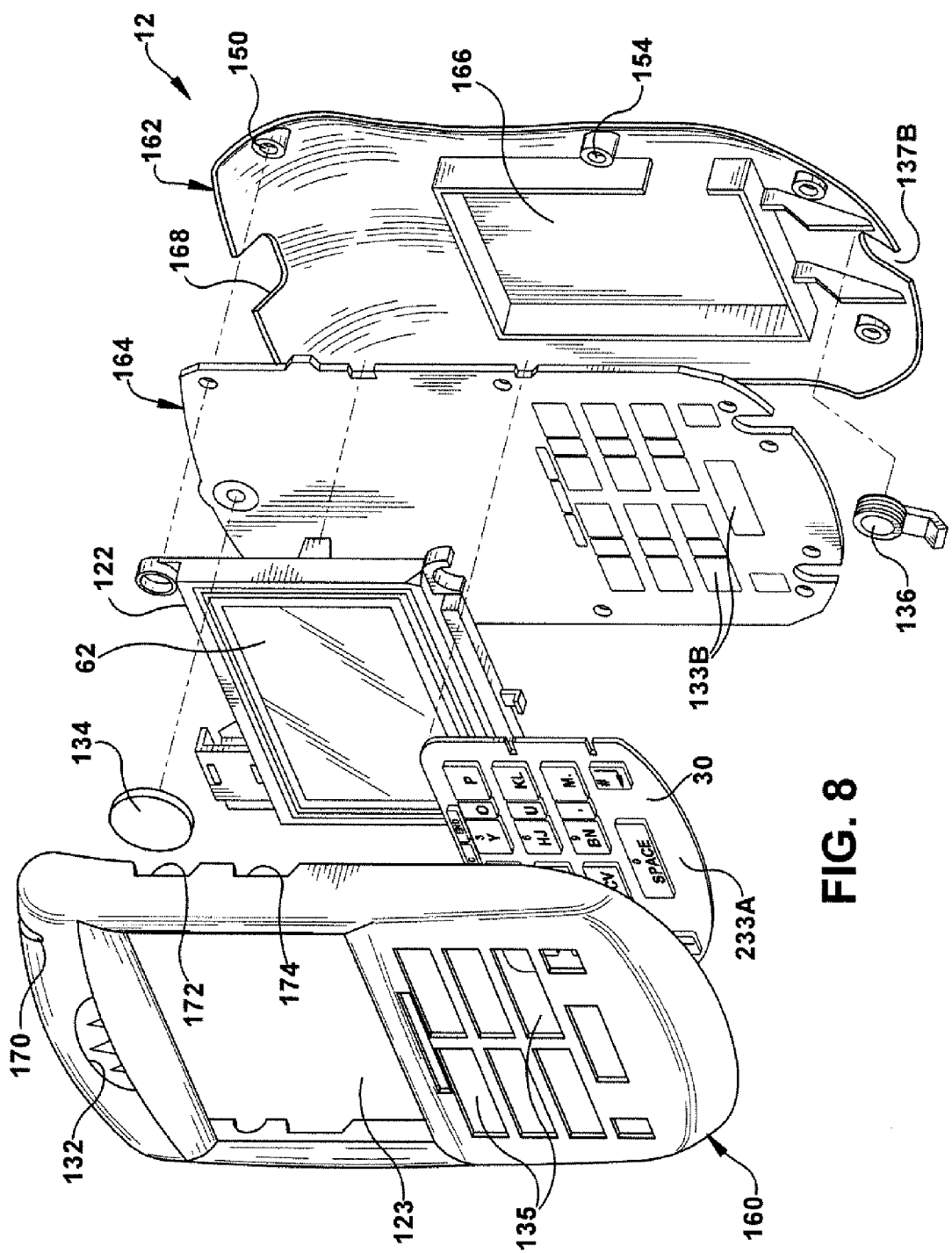
FIG. 8 is an exploded view of a handheld mobile communication device incorporating an example keyboard arrangement.

FIG. 8 is an exploded view of the hardware of a mobile communication device 12 incorporating an example keyboard arrangement 30. The device 12 includes a first device housing section 160 and a second device housing section 162. The housing sections are connected together with fasteners (not shown) that engage a plurality of holes 150, 154 to form a single integrated device housing that encloses the internal components of the mobile communication device 12. The fasteners may be screws, rivets or the like. Fasteners are but one example of possible components that may be used to couple the device housing sections 160, 162 together. Other components include flexible or rigid but deformable members, possibly integral with one of the device housing sections, which engage cooperating structures on the other or each device housing section or are deformed to hold the device housing sections together. The device housing sections 160, 162 might also or instead be coupled together by bonding, with adhesive, for example. However, the device housing sections 160, 162 are preferably coupled together using releasable fasteners such as screws.

Referring to FIG. 8, the device 12 includes a PCB (printed circuit board) 164. Most of the internal components of the mobile communication device 12 are preferably mounted on the PCB 164. The keyboard 30 is preferably formed by positioning a key web 133A over a plurality of switches 133B on the PCB 164. The key web 133A and plurality of switches 133B are preferably configured such that each key in the key web 133A contacts and operates one of the switches 133B when the key is depressed. Other configurations may also be implemented, in which the number of switches 133B may be less than the number of keys on the key web 133A, or the number of switches 133B may be greater than the number of keys on the key web 133A. The key web 133A and switches 133B are also positioned such that the apertures 135 on the first device housing section 160 at least partially expose the keyboard 30. Portions of the key web 133A are exposed by the apertures 135 to provide key surfaces that may be depressed by a user to provide data input to the device 12. Such data input may, for example, be used to generate data communications on the device 12.

A display 62 is preferably mounted on the PCB 164, as shown in FIG. 8. When the first device housing section 160 and second device housing section 162 are coupled together, an aperture 123 in the first device housing section 160 at least partially exposes the display 62. The aperture 123 in the first device housing section 160 and the display 62 on the PCB 164 may be positioned such that a viewing area of the display 62 is exposed. The frame and other components associated with the display 62 are preferably hidden from view when the first and second device housing sections 160, 162 are coupled together.

A speaker 134 is preferably mounted at or near the top of the PCB 164. One or more apertures 132 in the first device housing section 160 are positioned to at least partially expose the speaker 134 when the first and second device housing sections 160, 162 are coupled together. A microphone 136 is mounted in the second device housing section 162. The microphone 136 is at least partially exposed by the aperture 137B in the second device housing section 162, and coupled to the PCB and other device components. Other apertures may also be provided for the speaker and/or microphone. Audio or voice inputs to the microphone 136 may be used, for example, to generate voice communications. When the microphone 136 is positioned in the housing, an aperture (not shown) is provided in the first device housing section 160 to at least partially expose the microphone 136. The microphone 136 may alternatively be mounted in the first device housing section 160 or on the PCB 164.

The device housing sections 160, 162 may include further apertures to expose or partially expose other device components. In the first device housing section 160, apertures 170, 172 and 174 are configured to partially expose the auxiliary I/O devices. An aperture 168 is similarly positioned in the second device housing section 162 to at least partially expose an auxiliary I/O device. An aperture 166 in the second device housing section 162 may be provided to accommodate a power supply such as a battery. Other apertures may also be provided in the device housing as necessary.

Other internal components of the device 12 may also be mounted on the PCB 164. The device components are interconnected to provide at least data and voice communication functionality, possibly in addition to further local non-communication functions and short-range communication functions. Although these other internal components are not shown in FIG. 8, most of them are preferably mounted on the rear side of the PCB 264, opposite the side on which the keyboard 30, display 62 and speaker 134 are mounted, but some components may be mounted adjacent to the display 62 and/or keyboard 30 or on or along an edge of the PCB 164. The internal components of the device 12 are interconnected as necessary, through wired connections, PCB tracks, other types of connectors or connections, or possibly combinations thereof.

The first and second device housing sections 160, 162, when coupled together, form a handheld mobile communication device housing enclosing the PCB 164 and internal components. The apertures 135, 123, 132 and 137B at least partially expose the speaker 134, display 62, keyboard 30 and microphone 136 as described above. Partial exposure of these components allows a user to make use of these components while at the same time protecting the components from damage. Apertures 168, 170, 172, 174 similarly expose and protect auxiliary I/O devices. When access to a component will normally be required relatively infrequently, a removable cover element may be provided for a corresponding device housing aperture. In the above example of a device power supply, a cover (not shown) is preferably provided for the aperture 166. Access to the power supply is thereby possible when required, yet the battery remains protected when access thereto is not necessary.

The assembly in FIG. 8 offers manufacturing advantages for the device 12. Mounting of most internal device components on a single PCB 164 simplifies manufacture of the PCB in that only a single PCB must be built and positioned in a device housing section. Interconnections between different PCBs and problems associated with accurate relative placement of multiple PCBs are thereby avoided. During manufacture, the PCB 164 may be positioned on or in either the first device housing section 160 or the second device housing section 162. The other device section is then moved into place and the housing sections are coupled together to enclose the PCB and other internal device components in a single integrated device housing. Once assembled, the device housing is static, and device housing sections need not be moved relative to each other to provide for voice and data communication or other functions. Advantageously, breakage of movable device housing sections and typically problematic hinge arrangements and connections are thereby avoided.

The mobile communication device 12 may also include a predictive text computer program that is used in conjunction with the keyboard. Predictive test software is useful in reduced format keyboards, such as the example keyboard, in order to identify the desired input from the combination of keystrokes of a user. A predictive text computer program may, for example, be used to predict a complete word or phrase from one or more keystrokes. If the predictive text computer program does not successfully predict a desired word or phrase, then text-entry characters may be entered more precisely, albeit more slowly, by selecting the appropriate characters on the keys via multi-tap or selection from a list displayed on the display, among other selection techniques. Predictive text methodologies often include a disambiguation engine and/or a predictive editor application. A number of U.S. and foreign patents discuss predictive text procedures, including: U.S. Pat. Nos. 5,818,437, 5,952,942, 6,002,390, 6,223,059, 6,231,252, and 6,307,548; WO62150A1; WO9959310A2; WO0344650A2; EP1035712B1; EP129621A1 EP1378817A1; EP1347362A1; and LP1347361A1, the disclosures of which are incorporated herein by reference in their entirety. Several mobile communication device manufacturers utilize predictive text technologies, including RIM, Tegic, Motorola, Nokia, Sony, and NEC, among others.

A number of different predictive text methodologies are known and may be utilized with the example modified keyboard. These methodologies utilize database software to predict the entered text. One method involves automatically correcting common spelling mistakes (e.g., "teh" corrected to "the"). Predictive text methodologies use known spellings of words in combination with their probabilities and frequencies of use to determine a preferred word based upon input commands by a user. Disambiguation engines and predictive editor applications may be used to establish a single grammatical or semantic interpretation of the keystrokes entered by a user. With predictive editor applications, the display 62 of the device 12 depicts possible character sequences corresponding to the keystrokes that were entered. Typically, the most commonly used word is displayed first. The user may select other, less common words manually, or otherwise. Other types of predictive text computer programs may be utilized with the keyboard arrangement and keyboard described herein, without limitation.

Figure 9:
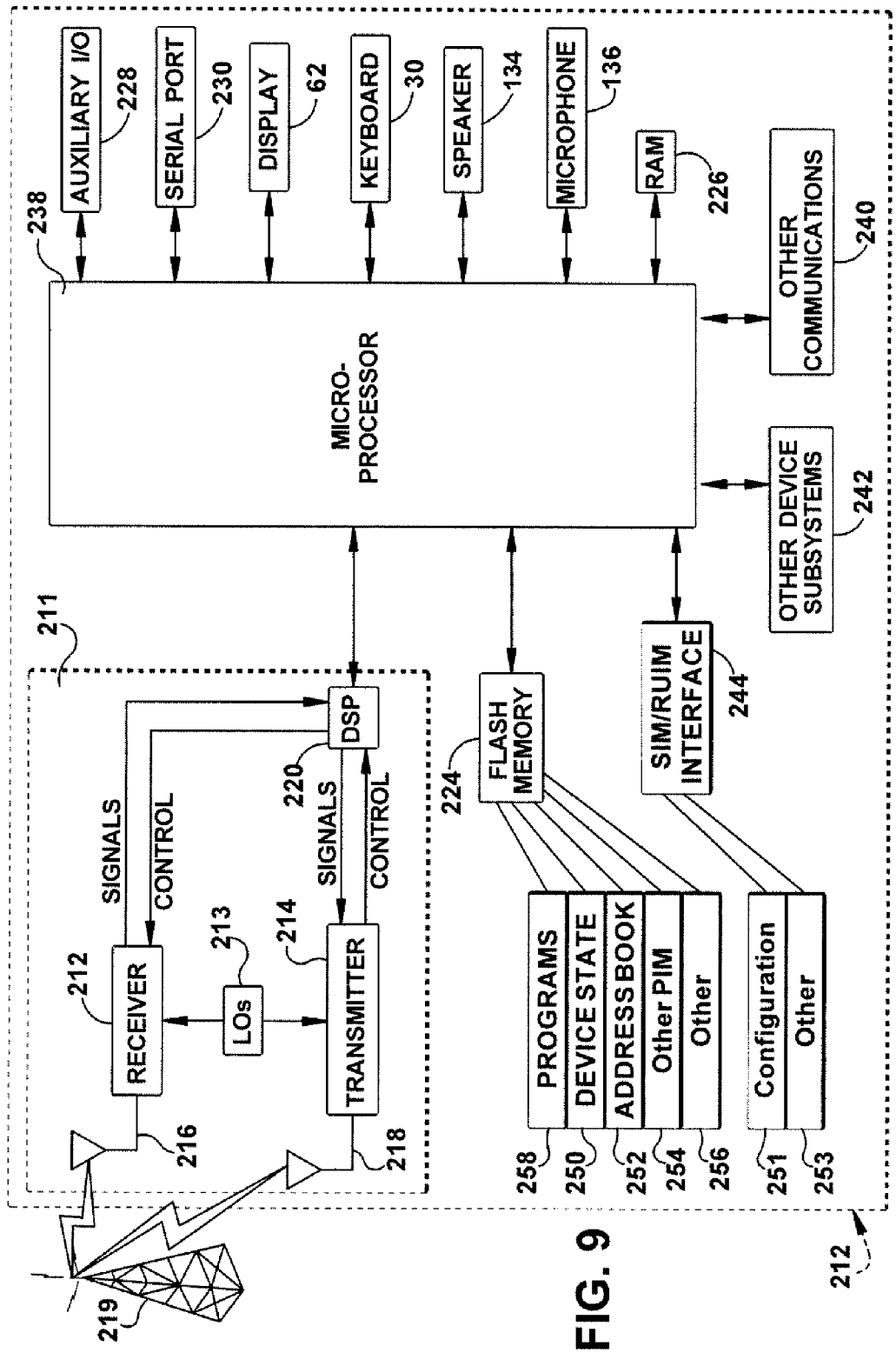
FIG. 9 is a block diagram illustrating the subsystems of interest in the mobile communication device.

The handheld mobile communication devices 12, presented in FIGS. 6, 8, and 9 include similar features, such as a housing 160, 162, a keyboard 30 and an output device 62. The output device shown is a display 62, which is preferably a full graphic LCD. Other types of output devices may alternatively be utilized. A processing device 102, which is shown schematically in FIG. 9, is contained within the housing 160, 162 and is coupled between the physical keyboard 30 and the display 62. The processing device 102 controls the operation of the display 62, as well as the overall operation of the mobile communication device 12, in response to actuation of keys on the keyboard 30 by the user.

The housing 160, 162 may be elongated vertically, or may take on other sizes and shapes, including a clamshell housing structure, among other structures. The keyboard may include a mode selection key, or other hardware or software for switching between text entry and telephony entry.

FIG. 9 is a block diagram illustrating the subsystems of interest in the mobile electronic device 12. Mobile wireless device 12 is preferably a two-way wireless electronic communication device having at least voice and/or data communication capabilities. Depending on the exact functionality provided, the wireless device may be referred to as a data messaging device, a two-way pager, a wireless e-mail device, a cellular telephone with or without data messaging capabilities, a wireless Internet appliance, or a data communication device, as examples.

Where mobile wireless device 12 is enabled for two-way communication, it incorporates a radio subsystem 211, including both a receiver 212 and a transmitter 214, as well as associated components such as one or more, preferably embedded or internal, antenna elements 216 and 218, local oscillators (LOs) 213, and a processing module such as a digital signal processor (DSP) 220. As will be apparent to those skilled in the field of communications, the particular design of the radio subsystem 211 is dependent upon the communication network in which the device 12 is intended to operate.

Mobile wireless device 12 preferably includes a microprocessor 238 that controls the overall operation of the device. Communication functions, including at least data and/or voice communications, are performed through radio subsystem 211. Microprocessor 238 also interacts with further device subsystems such as the display 62, flash memory 224, random access memory (RAM) 226, auxiliary input/output (I/O) subsystems 228, serial port 230, keyboard 30, speaker 134, microphone 136, a short-range communications subsystem 240 and any other device subsystems generally designated as 242.

Operating system software 250, 251, 252, 253, 254, 256, 258 executed by the processing device 238 is preferably stored in a persistent store, such as a flash memory 224, but may be stored in other types of memory devices, such as a read only memory (ROM) or similar storage element. In addition, system software, specific device applications, or parts thereof, may be temporarily loaded into a volatile store, such as a random access memory (RAM) 226. Communication signals received by the mobile communication device may also be stored to the RAM 226.

The processing device 238, in addition to its operating system functions, enables execution of software applications 250, 251, 252, 253, 254, 256, 258 on the device 12. A predetermined set of applications that control basic device operations, such as data and voice communications, may be installed on the device 12 during manufacture. In addition, a personal information manager (PIM) application 254 may be installed during manufacture. The PIM 254 is preferably capable of organizing and managing data items, such as e-mail, calendar events, voice mails, appointments, and task items. The PIM application is also preferably capable of sending and receiving data items via a wireless network 211. Preferably, the PIM data items are seamlessly integrated, synchronized and updated via the wireless network 211 with the device user's corresponding data items stored or associated with a host computer system. An example system and method for accomplishing these steps is disclosed in "System And Method For Pushing Information From A Host System To A Mobile Device Having A Shared Electronic Address," U.S. Pat. No. 6,219,694, which is owned by the assignee of the present application, and which is incorporated herein by reference.

Communication functions, including data and voice communications, are performed through the communication subsystem 211, and possibly through the short-range communications subsystem. The specific design and implementation of the communication subsystem 211 is dependent upon the communication network in which the mobile communication device 12 is intended to operate. For example, a mobile communication device 12 may include a communication subsystem 211 designed to operate with the Mobitex™, Data TAC™ or General Packet Radio Service (GPRS) mobile data communication networks and also designed to operate with any of a variety of voice communication networks, such as AMPS, TDMA, CDMA, PCS, GSM, etc. Other types of data and voice networks, both separate and integrated, may also be utilized with the mobile communication device 12.

Network access requirements vary depending upon the type of communication system. For example, in the Mobitex and DataTAC networks, mobile devices are registered on the network using a unique personal identification number or PIN associated with each device. In GPRS networks, however, network access is associated with a subscriber or user of a device. A GPRS device therefore requires a subscriber identity module, commonly referred to as a SIM card, in order to operate on a GPRS network.

When required network registration or activation procedures have been completed, the mobile communication device 12 may send and receive communication signals over the communication network 219. Signals received from the communication network 219 by the antenna 216 are routed to the receiver 212, which provides for signal amplification, frequency down conversion, filtering, channel selection, etc., and may also provide analog to digital conversion. Analog-to-digital conversion of the received signal allows the DSP 220 to perform more complex communication functions, such as demodulation and decoding. In a similar manner, signals to be transmitted to the network 219 are processed (e.g. modulated and encoded) by the DSP 220 and are then provided to the transmitter 214 for digital to analog conversion, frequency up conversion, filtering, amplification and transmission to the communication network 219 (or networks) via the antenna 218.

In addition to processing communication signals, the DSP 220 provides for control of the receiver 211 and the transmitter 214. For example, gains applied to communication signals in the receiver 211 and transmitter 214 may be adaptively controlled through automatic gain control algorithms implemented in the DSP 220.

In a data communication mode, a received signal, such as a text message or web page download, is processed by the communication subsystem 211 and is input to the processing device 238. The received signal is then further processed by the processing device 238 for an output to the display 62, or alternatively to some other auxiliary I/O device 228. A device user may also compose data items, such as e-mail messages, using the keyboard 30 and/or some other auxiliary I/O device 228, such as a touchpad, a rocker switch, a thumb-wheel, or some other type of input device. The composed data items may then be transmitted over the communication network 219 via the communication subsystem 211.

In a voice communication mode, overall operation of the device is substantially similar to the data communication mode, except that received signals are output to a speaker 134, and signals for transmission are generated by a microphone 136. Alternative voice or audio I/O subsystems, such as a voice message recording subsystem, may also be implemented on the device 12. In addition, the display 62 may also be utilized in voice communication mode, for example to display the identity of a calling party, the duration of a voice call, or other voice call related information.

The short-range communications subsystem enables communication between the mobile communication device 12 and other proximate systems or devices, which need not necessarily be similar devices. For example, the short-range communications subsystem may include an infrared device and associated circuits and components, or a Bluetooth™ communication module to provide for communication with similarly-enabled systems and devices.

A method of using the above-discussed key arrangement includes manipulating a plurality of keys comprising at least one space key, at least one function key, and a plurality of alphabetic keys. Each alphabetic key is associated with a plurality of non-vowel characters and no more than one vowel character. The method also includes tapping each alphabetic key once to select a vowel character and tapping each alphabetic key more than one time to select a non-vowel character. The method may also include utilizing a predictive text technique to select subsequent vowel or non-vowel characters based on the key tapping sequence.

Another method of using the above-discussed key arrangement includes manipulating a plurality of keys comprising at least one space key, at least one function key, and a plurality of alphabetic keys. Each alphabetic key is associated with a plurality of non-vowel characters and no more than one vowel character and includes at least two outer sections and at least one center section. The method also includes tapping each alphabetic key once in the center section to select a vowel character and tapping each alphabetic key one or more times in an outer section to select a non-vowel character. The method may also include utilizing a predictive text technique to select subsequent vowel or non-vowel characters based on the key tapping sequence.

The present invention currently supports a standard QWERTY keyboard arrangement, but may easily be extended to support other keyboard layouts such as the QWERTZ, AZERTY, DVORAK, and FITALY keyboard layouts. Furthermore, the present invention may also be extended to support other languages that utilize the concept of vowels and consonants. For example, it is envisioned that a German, French, Spanish, Italian or Russian keyboard would be supported by this unique arrangement, as well as keyboards reflecting other international, national or regional dialects and languages. Further, such arrangements may be used for written communication in computer programming languages, mathematics and scientific expression.

Further examples may alternatively utilize one, two or three rows, or one, two, or three columns for the alphanumeric portion of the keyboard.

A key arrangement includes a plurality of keys associated with alphabetic characters that include consonants and vowels. Each key within the plurality of keys is associated with a plurality of consonants and no more than one vowel. The plurality of keys is arranged in a grid pattern having at least five keys. The consonants may be are arranged in the format of a standard key arrangement. The standard key arrangement is selected from the group of QWERTY, QWERTZ, AZERTY, DVORAK, and FITALY. The plurality of keys may be further associated with at least one of symbols, functions, and numbers. One or more additional keys may be provided for at least one of symbols, functions, and numbers.

Each of the keys within the plurality of keys may comprise indicia that is positioned on a surface of the respective key. The indicia is for identifying the associated consonants, vowels, symbols, functions or numbers.

In one example, the plurality of keys that are associated with alphabetic characters comprises at least 6 and the key arrangement further comprises a key associated with a space function. The plurality of alphabetic keys and space key are further associated with numbers, the numbers being arranged in a layout consistent with a standard telephone keypad arrangement. The plurality of keys associated with alphabetic characters may comprise six keys and the six keys may be arranged in a two column by three row grid. The key arrangement may also include a key associated with a space function and a key associated with a toggle function.

In one example, the keys associated with alphabetic characters include a first key associated with alphabetic characters Q, W, E, R, and T; a second key associated with alphabetic characters S, D, A, F, and G; a third key associated with alphabetic characters Z, X, I, C, and V; a fourth key associated with alphabetic characters Y, O, and P; a fifth key associated with alphabetic characters H, J, U, K, and L; and a sixth key associated with alphabetic characters B, N, and M and symbols comma (,) and period (.).

In another example, the keys associated with alphabetic characters comprise a first key associated with letter characters Q, W, E, R, and T; a second key associated with letter characters S, D, A, F, and G; a third key associated with letter characters Z, X, C, and V and a symbol comma (,); a fourth key associated with letter characters Y, U, and P; a fifth key associated with letter characters H, J, I, K, and L; and a sixth key associated with letter characters B, N, O, and M and a symbol period (.).

In yet another example, the plurality of keys that are associated with alphabetic characters include a first key associated with the numbers 1 and 2; a second key associated with the numbers 3 and 4; a third key associated with the numbers 5 and 6; a fourth key associated with the numbers 7 and 8; a fifth key associated with the number 9 and a symbol star (*); and a sixth key associated with a symbol pound (#). They also include an additional key associated with the space function and the number "0".

In a further example, the plurality of keys associated with alphabetic characters includes a first key associated with the numbers 1 and 2; a second key associated with numbers 3 and 4; a third key associated with numbers 5 and 6, a fourth key associated with numbers 7 and 8; a fifth key associated with number 9 and a symbol star (*); and a sixth key associated with number 0. The key arrangement may further include a key associated with a space function and a symbol pound (#).

The plurality of keys associated with alphabetic characters may be associated with numbers and may also include at least three additional keys including a first additional key being associated with a symbol (*), a second additional key being associated with a space function and zero or more numbers, and a third key being associated with a symbol (#).

The key arrangement may also include one or more communication keys that comprise at least a send function and an end function. In one example, the communication keys include a key associated with a send function, a key associated with an end function, and a convenience key, all of which are aligned adjacent one another in a common row that is positioned above the plurality of keys associated with alphabetic characters. The send, end, and convenience functions could be associated with a single toggle key have three individual sections, one for each function.

The keys within the key arrangement may each have a body having a plurality of sections that comprise at least two outer sections and an inner section, with consonant indicia being positioned in a section of the respective key that is distinct from the vowel indicia. The vowel indicia may be associated with the inner section and the consonant indicia may be associated with the outer sections. The plurality of sections may each have a top surface that is one of aligned with or not aligned with the top surfaces of the other sections. The top surfaces of the two outer sections may be associated with a common plane, and the top surface of the inner section may be associated with a different plane, with the different plane being one of higher than or lower than the common plane. A recess may be positioned between adjacent sections. The outer sections may comprise a first outer section and a second outer section, with the inner section, the first outer section and the second outer section each being associated with a different plane. Furthermore, each of the sections may be associated with a surface treatment.

A mobile communication device may comprise the key arrangement discussed above, a housing, a display, a processor, and a plurality of switches. The plurality of keys associated with alphabetic characters are associated with the housing. The display is coupled to the housing. The processor is positioned inside the housing for communicating with the keys and the display. The plurality of switches are coupled to the keys for communicating an input command based upon the selected key section of each key to the processor. The plurality of switches may be toggle switches.

The mobile device may also include predictive text programming associated with the processor for predicting the desired input command based upon the selected section of the key. The mobile device may also include a key associated with a send function and a key associated with an end function, both of which are associated with a common row that is positioned above the plurality of keys associated with alphabetic characters.

A method of using a key arrangement comprises manipulating a plurality of keys comprising at least one space key, at least one function key, and a plurality of alphabetic keys, with each alphabetic key being associated with a plurality of non-vowel characters and no more than one vowel character, tapping each alphabetic key once to select a vowel character; and tapping each alphabetic key more than one time to select a non-vowel character. The method may also include utilizing a predictive text technique to select subsequent vowel or non-vowel characters based on the key tapping sequence.

Another method of using a key arrangement includes manipulating a plurality of keys comprising at least one space key, at least one function key, and a plurality of alphabetic keys, with each alphabetic key being associated with a plurality of non-vowel characters and no more than one vowel character. The keys each include at least two outer sections and at least one center section. The method also includes tapping each alphabetic key once in the center section to select a vowel character; and tapping each alphabetic key one or more times in an outer section to select a non-vowel character. The method may also include utilizing a predictive text technique to select subsequent vowel or non-vowel characters based on the key tapping sequence.

The word "substantially," if used herein, is a term of estimation.

While various features of the claimed invention are presented above, it should be understood that the features might be used singly or in any combination thereof. Therefore, the claimed invention is not to be limited to only the specific embodiments depicted herein.

Further, it should be understood that variations and modifications may occur to those skilled in the art to which the claimed invention pertains. The embodiments described herein are exemplary of the claimed invention. The disclosure may enable those skilled in the art to make and use embodiments having alternative elements that likewise correspond to the elements of the invention recited in the claims. The intended scope of the invention may thus include other embodiments that do not differ or that insubstantially differ from the literal language of the claims. The scope of the present invention is accordingly defined as set forth in the appended claims.

What is claimed is:

1. A key arrangement comprising:
a plurality of keys associated with alphabetic characters that include consonants and vowels, wherein each key of the plurality of keys is associated with a plurality of consonants and no more than one vowel and said plurality of keys is arranged in a two column by three row grid pattern comprising six keys.

2. The key arrangement of claim 1, wherein the consonants are arranged in a format of the consonants of a standard key arrangement.

3. The key arrangement of claim 2, wherein the standard key arrangement is selected from the group of QWERTY, QWERTZ, AZERTY, DVORAK, and FITALY.

4. The key arrangement of claim 1, wherein said plurality of keys are further associated with at least one of symbols, functions, and numbers.

5. The key arrangement of claim 1, further comprising one or more additional keys associated with at least one of symbols, functions, and numbers.

6. The key arrangement of claim 4, wherein each key of the plurality of keys comprises indicia that is positioned on a surface of the respective key, said indicia identifying the associated consonants, vowels, symbols, functions or numbers.

7. The key arrangement of claim 1, wherein the plurality of keys associated with alphabetic characters comprises at least six keys, the key arrangement further comprises a key associated with a space function, and the plurality of keys associated with alphabetic keys and the key associated with a space function are further associated with numbers, the numbers being arranged in a layout consistent with a standard telephone keypad arrangement.

8. The key arrangement of claim 1, wherein the plurality of keys associated with alphabetic characters comprises six keys.

9. The key arrangement of claim 1, further comprising a key associated with a space function and a key associated with a toggle function.

10. The key arrangement of claim 4, wherein the plurality of keys associated with alphabetic characters comprise:
a first key associated with alphabetic characters Q, W, L, R, and I;
a second key associated with alphabetic characters S, D, A, F, and G;
a third key associated with alphabetic characters Z, X, I, C, and V;
a fourth key associated with alphabetic characters Y, O, and P;
a fifth key associated with alphabetic characters H, J, U, K, and L; and
a sixth key associated with alphabetic characters B, N, and M and symbols comma (,) and period (.).

11. The key arrangement of claim 4, wherein the plurality of keys associated with alphabetic characters comprise:
a first key associated with letter characters Q, W, L, R, and T;
a second key associated with letter characters S, D, A, F, and C;
a third key associated with letter characters Z, X, C, and V and a symbol comma a fourth key associated with letter characters Y, U, and P;
a fifth key associated with letter characters H, J, I, K, and L; and
a sixth key associated with letter characters B, N, O, and M and a symbol period (.).

12. The key arrangement of claim 4, wherein the plurality of keys associated with alphabetic characters comprise:
a first key associated with the numbers 1 and 2;
a second key associated with the numbers 3 and 4;
a third key associated with the numbers 5 and 6;
a fourth key associated with the numbers 7 and 8;
a fifth key associated with the number 9 and a symbol star (*);
a sixth key associated with a symbol pound (#); and
further comprising an additional key associated with the space function and the number "0".

13. The key arrangement of claim 4, wherein the plurality of keys associated with alphabetic characters comprise:
a first key associated with the numbers 1 and 2;
a second key associated with numbers 3 and 4;
a third key associated with numbers 5 and 6;
a fourth key associated with numbers 7 and 8;
a fifth key associated with number 9 and a symbol star (*); and
a sixth key associated with number 0.

14. The key arrangement of claim 13, further comprising a key associated with a space function and a symbol pound (#).

15. The key arrangement of claim 1, wherein said plurality of keys associated with alphabetic characters are further associated with numbers, and said key arrangement further comprising at least three additional keys including a first additional key being associated with a symbol (*), a second additional key being associated with a space function and zero or more numbers, and a third key being associated with a symbol (#).

16. The key arrangement of claim 1, further comprising one or more communication keys that comprise at least a send function and an end function.

17. The key arrangement of claim 16, wherein said communication keys include a key associated with a send function, a key associated with an end function, and a convenience key, all of which are aligned adjacent one another in a common row that is positioned above the plurality of keys associated with alphabetic characters.

18. The key arrangement of claim 6, wherein each key of said plurality of keys associated with alphabetic characters includes a body having a plurality of sections that comprise at least two outer sections and an inner section, with said consonant indicia being positioned in a section of the respective key that is distinct from the vowel indicia.

19. The key arrangement of claim 18, wherein the vowel indicia is associated with the inner section and the consonant indicia is associated with the outer sections.

20. The key arrangement of claim 18, wherein the plurality of sections each have a top surface that is one of aligned with or not aligned with the top surfaces of the other sections.

21. The key arrangement of claim 20, wherein the top surfaces of the at least two outer sections are associated with a common plane, and the top surface of the inner section is associated with a different plane, with the different plane being one of higher than or lower than the common plane.

22. The key arrangement of claim 20, further comprising a recess positioned between adjacent sections.

23. The key arrangement of claim 20, wherein the outer sections comprise a first outer section and a second outer section, with the inner section, the first outer section and the second outer section each being associated with a different plane.

24. The key arrangement of claim 20, wherein each of the plurality of sections is associated with a surface treatment.

* * * * *

UNITED STATES PATENT AND TRADEMARK OFFICE
CERTIFICATE OF CORRECTION

PATENT NO.       : 7,658,561 B2
APPLICATION NO.  : 11/535547
DATED            : February 9, 2010
INVENTOR(S)      : Thanh Vinh Vuong It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 466 days.

Signed and Sealed this

Twenty-eighth Day of December, 2010

David J. Kappos
*Director of the United States Patent and Trademark Office*